(12) United States Patent
Killick et al.

(10) Patent No.: US 8,975,214 B2
(45) Date of Patent: Mar. 10, 2015

(54) EMULSION ADJUVANT FOR HERBICIDES

(75) Inventors: Robert William Killick, Mount Waverley (AU); Andrew Robert Killick, Richmond (AU); Peter William Jones, Menzies Creek (AU); John David Morrison, Thomastown (AU)

(73) Assignee: Innovative Chemical Services Pty Ltd, Coolaroo Vic (AU)

( * ) Notice: Subject to any disclaimer, the term of this patent is extended or adjusted under 35 U.S.C. 154(b) by 0 days.

(21) Appl. No.: 13/580,700

(22) PCT Filed: Feb. 22, 2011

(86) PCT No.: PCT/AU2011/000189
§ 371 (c)(1),
(2), (4) Date: Aug. 23, 2012

(87) PCT Pub. No.: WO2011/103619
PCT Pub. Date: Sep. 1, 2011

(65) Prior Publication Data
US 2012/0316068 A1    Dec. 13, 2012

(30) Foreign Application Priority Data
Feb. 23, 2010 (AU) ............................... 2010900739

(51) Int. Cl.
*A01N 25/02* (2006.01)
*C05G 3/00* (2006.01)
*C05D 9/02* (2006.01)
*C05G 3/06* (2006.01)

(52) U.S. Cl.
CPC ....... *C05G 3/007* (2013.01); *C05D 9/02* (2013.01); *C05G 3/06* (2013.01)
USPC .......................................................... 504/363

(58) Field of Classification Search
CPC ........... C05D 9/02; A01N 25/30; A01N 25/02
USPC ........................................ 504/362, 101, 364
See application file for complete search history.

(56) References Cited

U.S. PATENT DOCUMENTS

| 2003/0125211 A1 | 7/2003 | Woznica et al. |
| 2010/0160168 A1* | 6/2010 | Lindner ........................ 504/362 |
| 2011/0152082 A1* | 6/2011 | Sixl et al. ...................... 504/101 |

FOREIGN PATENT DOCUMENTS

| CA | 2694028 | 12/2008 | |
| WO | 2007030885 | 3/2007 | |
| WO | 2007050090 | 5/2007 | |
| WO | 2008127661 | 10/2008 | |
| WO | WO2008127661 | * 10/2008 | ............. A01N 25/02 |

OTHER PUBLICATIONS

Bayer, Title: Polyols from Bayer Material Science; published Mar. 2010.*

* cited by examiner

*Primary Examiner* — Johann R Richter
*Assistant Examiner* — Yanzhi Zhang
(74) *Attorney, Agent, or Firm* — Hahn Loeser + Parks LLP

(57) ABSTRACT

An oil-in-water emulsion liquid composition suitable for use as an agricultural adjuvant comprising an oil, a saturated or substantially saturated aqueous solution of an ammonium salt and one or more of high molecular weight polymeric surfactants.

14 Claims, No Drawings

EMULSION ADJUVANT FOR HERBICIDES

CROSS-REFERENCE TO RELATED APPLICATIONS

This application is a national stage of International Application No. PCT/AU2011/000189, filed Feb. 22, 2011, and claims priority to Australian Application No. 2010 900739 filed Feb. 23, 2010.

FIELD OF THE INVENTION

The invention relates to adjuvants for use in agriculture. More particularly, the invention relates to emulsion compositions having an oil and an ammonium salt solution as an adjuvant for enhancing the effect of agrochemicals (also known as agrichemicals).

BACKGROUND OF THE INVENTION

In this specification where a document, act or item of knowledge is referred to or discussed, this reference or discussion is not an admission that the document, act or item of knowledge or any combination thereof was at the priority date publicly available, known to the public, part of the common general knowledge or known to be relevant to an attempt to solve any problem with which this specification is concerned.

Adjuvants are used in agriculture to assist the performance of agrochemicals such as herbicides, insecticides, fungicides, growth promoters etc. Many different classes of chemicals are used as adjuvants to assist the agrochemical in different ways. For example:
- oils for foliar penetration or to reduce evaporation,
- surfactants (often also called emulsifiers) for surface wetting, coverage and/or penetration,
- buffering agents for protecting sensitive agrochemicals, and
- ammonium salts to provide hard water protection, promote compatibility and stimulate plant uptake of agrochemicals.

When preparing a mixture for spraying, an applicator may need more than one class of adjuvant and thus create a complex tank mix containing multiple adjuvant products and crop protection product(s). This can lead to problems such as incompatibility between the various products added to the spray tank or other unforeseen problems such as crop damage or toxicity to non-target organisms.

Recently, products which combined two or more classes of adjuvant have been made available. One such product combining lipophilic solvent (oil) and lipophobic plant nutrient (ammonium salt) is described by U.S. Pat. No. 7,314,848 which uses cationic surfactants to form a homogeneous liquid composition suitable as an agrochemical adjuvant, particularly for use with the herbicide glyphosate.

While cationic surfactants are powerful surfactants for a number of reasons, they are not the most desirable surfactants for use in agrochemical formulations. The use of cationic surfactants may increase the risk of tank mix incompatibility, foaming, driftable fines, crop phytotoxicity and toxicity to non-target organisms, such as beneficial insects, birds and aquatic life.

A liquid emulsion adjuvant product needs to be convenient to use (pourable and dispersible into water) and have a shelf-life (no substantial change) of at least a few months, and preferable greater than one year, to be useful. That is, such liquid emulsion products need to be stable, pourable and dispersible into water.

Generally, the amount of surfactant required to produce such a stable, pourable and dispersible liquid emulsion adjuvant product is related to the proportion of oil in the formulation. As a result, a higher proportion of surfactant is required to produce a stable emulsion containing a higher proportion of oil than emulsion containing a lower amount of oil. Further, an even higher proportion of surfactant is required to produce a stable emulsion if the aqueous phase contains electrolytes than an equivalent electrolyte-free formulation. For example, prior art formulations containing oil and saturated or nearly saturated solutions of ammonium salts using surfactants involve:
- a proportion of surfactant (both oil compatible and water soluble electrolyte tolerant surfactants) to oil which is generally greater than 1:1, and is always greater than 2:3 (US2008127661; see examples);
- a proportion of surfactant to oil of more than 1:1 (US20030125211 and US20070032382, see examples); and
- a proportion of surfactant (combination of nonionic and anionic surfactants) to oil of at least 1:2 (WO99/55645, see examples containing more concentrated ammonium salt solution (more than 5%)).

There is thus a need for improved adjuvant formulations which combine oils and ammonium onium salts in a form suitable for use as an agricultural adjuvant, but which also minimize the amount of powerful or harsh surfactants used, and thus reduce the detrimental effects of such surfactants.

SUMMARY OF THE INVENTION

It has surprisingly been found that certain polymeric surfactants can be used to prepare formulations suitable for use as agricultural adjuvants which contain oil and concentrated aqueous solutions of ammonium salts. Such adjuvant formulations contain a lower amount of surfactant than prior art formulations containing an equivalent amount of oil and ammonium salts. This has the benefit of reducing the detrimental effects due to the use of high levels of surfactants.

According to a first aspect of the invention, there is provided a liquid emulsion composition suitable for use as an agricultural adjuvant comprising:
(a) an amount in the range of from 5 to 95% w/w (preferably 10 to 80% w/w) of an oil selected, from the group consisting of mineral oils, vegetable oils, esters of fatty acids, aliphatic alcohols and mixtures thereof;
(b) an amount in the range of from 5 to 95% w/w (preferably 20 to 80% w/w) of a saturated or substantially saturated aqueous solution of an ammonium salt selected from the group consisting of ammonium sulphate, ammonium phosphates, ammonium nitrate and mixtures thereof; and
(c) an amount in the range of from 0.1 to 5% w/w of one or more high molecular weight polymeric surfactants having a molecular weight in the range of from 2000 to 12000;
wherein the proportion of total surfactants to oil in the composition is less than 1:3.

The liquid emulsion composition according to the invention is stable, pourable and dispersible into water.

The oil must be liquid and crop safe. Preferred mineral oils have a carbon number in the range of 12 to 30, are low in aromatic compounds and have a viscosity (at 40° C.) in the range of approximately 5 to 50 cSt. Suitable vegetable oils include all liquid vegetable oils. Preferably, the vegetable oils are refined so as to remove gums and excess acidity to ensure that the liquid emulsion composition is stable, liquid and sprayable. More preferably, the amount of oil used in the composition is in the range of from 10 to 60% w/w, even more preferably 15 to 50% w/w, and most preferably 20 to 50% w/w.

Suitable esters of fatty acids include alkyl esters of fatty acids wherein:
the alkyl moiety may be methyl, ethyl, propyl or butyl; and
the fatty acids are from any natural or synthetic source, are saturated and/or unsaturated and the majority of the fatty acids have a carbon number of from 12 to 22.

Typical embodiments are methyl esters of canola oil, where the major component is methyl oleate.

Where an aliphatic alcohol is the oil of choice, it may be selected from primary or secondary alcohols having a carbon number of from 8 to 22 and may be saturated or unsaturated. A typical embodiment is a C-12 Guerbet alcohol.

The concentration of the ammonium salt in the saturated or substantially saturated aqueous solution will vary depending on the ammonium salt selected. For example, where the ammonium salt is either sulphate, nitrate or phosphate, then a solution containing approximately 20-50% w/w of the ammonium salt in water may be used. Where ammonium nitrate is the preferred ammonium salt, then it is common to prepare an aqueous solution further containing urea. For example, UAN32 contains 45 parts ammonium nitrate, 35 parts urea and 20 parts water.

The examples of ammonium salt solutions above may not be the maximum concentrations technically possible, but reflect the commercial high concentration solutions typically used in the fertilizer industry which must allow for cold temperatures and/or loss of water through evaporation without the risk of crystallization.

More preferably, the amount of saturated or substantially saturated aqueous solution of ammonium salts used in the composition is in the range of from 40 to 80% w/w, and most preferably 50 to 75% w/w.

The high molecular weight polymeric surfactants are present in the formulation to maintain the oil and the saturated or substantially saturated aqueous solution of ammonium salts together in a stable liquid formula. Preferably, the amount of high molecular weight polymeric surfactants used in the composition is 0.1 to 5% w/w, more preferably 0.1 to 3% w/w, and most preferably 0.2 to 2% w/w.

Suitable high molecular weight polymeric surfactants having a molecular weight in the range 2000 to 12000 are typically linear. Examples of suitable high molecular weight polymeric surfactants having a molecular weight in the range 2000 to 12000 include:
polyalkylene oxide block copolymers of a simple primary alcohol (e.g. ethylene oxide-propylene oxide block copolymers of butanol) such as Atlas™ G-5000, Termul™ 5429 or Tergitol™ XJ, XD or XH;
polyisobutene succinic anhydride-polyethylene glycol such as Atlox™ 4914;
polyhydroxystearate polyethers such as Atlox™ 4912, or
polyalkylene oxide triblock copolymers of the type EO/PO/EO (where EO is ethylene oxide and PO is propylene oxide) such as Synperonic™ PE/F 127 and Poloxomer™ 338.

Preferably, the composition may include an additive such as acidifiers or dispersing agents which may be desirable to help the application of the composition. Acidifiers may be added where a lower pH is required in the tank, for example when using alkaline sensitive agrochemicals. Suitable acidifiers include sulphamic acid, propionic acid or citric acid but many others may be equally suitable.

A dispersing agent may be added where there is a need to more easily disperse the emulsion (e.g. in a mixer tank). The dispersing agent may be selected from the group consisting of nonionic surfactants (e.g. alcohol ethoxylates, fatty acid ethoxylates, glycerol monooleate, polysorbate, and alkyl polyglucosides), anionic surfactants (e.g. calcium dodecylbenzene sulphonate, sulphated or phosphated fatty alcohols/fatty alcohol polyethers, alkyl polyether carboxylates and salts) and mixtures thereof. Typically, the amount of dispersing agent used is up to 5% w/w of the total composition.

When determining the proportion of total surfactants to oil in the composition, the determination must include all surfactants in the composition, for example any dispersing agents which are surfactants and the polymeric surfactant (c). Preferably, the proportion of total surfactants to oil in the composition is less than 1:4, and more preferably less than 1:6.

Compositions according to the invention are typically comprised of at least 94% w/w of oil and the saturated or substantially saturated aqueous solution of ammonium salts with the total amount of surfactants (including the high molecular weight polymeric surfactants and any dispersing agents) typically not being more than 6% w/w. The invention thus enables the production of liquid emulsion compositions containing oil and concentrated ammonium salt solutions which contain very low levels of surfactants enabling their use in situations where the use of harsh surfactants is restricted.

According to a second aspect of the invention, there is provided a method for reducing one or more of the detrimental effects caused by high levels of surfactants used in adjuvants for agrochemical formulations, the method comprising combining one or more agrochemicals with a liquid emulsion composition suitable for use as an agricultural adjuvant comprising:
(a) an amount in the range of from 5 to 95% w/w (preferably 20 to 80% w/w) of an oil selected from the group consisting of mineral oils, vegetable oils, esters of fatty acids, aliphatic alcohols and mixtures thereof;
(b) an amount in the range of from 5 to 95% w/w (preferably 20 to 80% w/w) of a saturated or substantially saturated aqueous solution of an ammonium salt selected from the group consisting of ammonium sulphate, ammonium phosphates, ammonium nitrate and mixtures thereof; and
(c) an amount in the range of from 0.1 to 5% w/w of one or more high molecular weight polymeric surfactants having a molecular weight in the range of from 2000 to 12000;
wherein the proportion of total surfactants to oil in the composition is less than 1:3.

EXAMPLES

Various embodiments/aspects of the invention will now be described with reference to the following non-limiting examples.

Example 1

In this example, various formulations according to the invention were prepared.

Each of Compositions A to K was prepared by separately preparing an oil phase (oil, polymeric surfactant and dispersing agent) and an aqueous phase (ammonium salt and acidifier in water) then slowly adding the oil phase to the aqueous phase whilst mixing with a high speed laboratory blender. A stable milky emulsion was formed.

Compositions A to K were evaluated for stability by (i) standing at room temperature for 28 days and (ii) standing in a controlled temperature oven at 54° C. for 14 days. Compositions A to K remained uniform with no free oil apparent in both experiments.

TABLE 1

Examples of formulations

| Component | Function | A | B | C | D | E | F | G | H | I | J | K |
|---|---|---|---|---|---|---|---|---|---|---|---|---|
| Water | Solvent | 34.0 | 34.0 | 34.0 | 45.4 | 37.0 | 37.0 | 37.0 | 4.7 | 53.4 | 33.8 | 13.4 |
| Ammonium Sulphate | Ammonium Salt | 20.0 | 20.0 | 20.0 | 29.1 | 21.0 | 21.0 | 21.0 | 3.0 | 34.2 | 20.0 | — |
| Ammonium Nitrate | Ammonium Salt | — | — | — | — | — | — | — | — | — | — | 30.1 |
| Urea | Additional Nitrogen source | — | — | — | — | — | — | — | — | — | — | 23.5 |
| Esterol 112 | Oil | 40.0 | 40.0 | 40.0 | 20.0 | 40.0 | 40.0 | 40.0 | 91.8 | 10.0 | 40.0 | — |
| Yubase 3 | Oil | — | — | — | — | — | — | — | — | — | — | 30.0 |
| Atlox 4914 | Polymeric Surfactant | 2.4 | — | — | — | — | — | — | — | — | — | — |
| Atlox 4912 | Polymeric Surfactant | — | — | — | — | — | — | — | 0.5 | — | — | — |
| Atlas G-5000 | Polymeric Surfactant | — | 1.0 | — | — | — | — | — | — | 0.35 | 1.0 | 1.0 |
| Tergitol XJ | Polymeric Surfactant | — | — | — | — | 2.0 | — | — | — | — | — | — |
| Tergitol XD | Polymeric Surfactant | — | — | 1.0 | 0.5 | — | 2.0 | — | — | — | — | — |
| Tergitol XH | Polymeric Surfactant | — | — | — | — | — | — | 2.0 | — | — | — | — |
| Synperonic PE/F 127 | Polymeric Surfactant | — | — | — | — | — | — | — | — | 0.05 | — | — |
| Sulphamic Acid | Acidifier | — | — | — | — | — | — | — | — | — | 0.2 | — |
| Teric G9A5 | Dispersing agent | 2.4 | — | — | — | — | — | — | — | — | — | — |
| Esterol 272 | Dispersing agent | 1.2 | — | — | — | — | — | — | — | — | — | — |
| Esterol 243 | Dispersing agent | — | 5.0 | — | — | — | — | — | — | 0.5 | 5.0 | — |
| Esterol 263 | Dispersing agent | — | — | 5.0 | 5.0 | — | — | — | — | 1.5 | — | — |
| Teric 16A22 | Dispersing agent | — | — | — | — | — | — | — | — | — | — | 2.0 |

The ratio of surfactant to oil in each of these compositions is set out below.

| Composition | Ratio of surfactant to oil |
|---|---|
| A | 6:40 |
| B | 6:40 |
| C | 6:40 |
| D | 5.5:20 (highest) |
| E | 2:40 |
| F | 2:40 |
| G | 2:40 |
| H | 0.5:91.8 (lowest) |
| I | 2.4:10 |
| J | 6:40 |
| K | 3:30 |

Example 2

In this example, the adjuvant effect of Compositions C and D from Example 1 was compared with a range of commercially available adjuvants when applied with glyphosate in 2 water hardnesses to control oats in a glasshouse.

Treatment List

| Product Name | Manufacturer | Active Constituents |
|---|---|---|
| ROUNDUP CT Broadacre herbicide | Monsanto | 450 g/l glyphosate as the isopropylamine salt |
| Deluge 1000 wetting agent | Victorian Chemicals | 950 g/l non-ionic fatty acid ethoxylates |
| Hot-Up Spray Adjuvant | Victorian Chemicals | 190 g/l mineral Oil 340 g/l nonionic/cationic surfactants 140 g/l ammonium sulphate |
| Assert Spray Adjuvant | Victorian Chemicals | 420 g/l ammonium sulphate |
| Infiltrator Spray Adjuvant | Victorian Chemicals | 700 g/l vegetable oil ester |

Experimental Conditions:

| | |
|---|---|
| Weed Species: | Oats 1.5-2 leaf |
| Application technique: | Track sprayer |
| Water: | 64 l/ha |
| Nozzles: | 11001 |
| Speed: | 6 kph |
| Glyphosate application rates: | 50 & 100 g a.i./ha |
| Water hardness: | All treatments were applied at 2 water hardness: Low (50 ppm $CaCO_3$) and High (300 ppm $CaCO_3$). High hardness is known to adversely affect the performance of the herbicide Glyphosate. |
| Replicates | 6 |
| Assessment: | Fresh weight 14 days after treatment. Results are reported as Fresh Weight % of untreated control |

Results

TABLE 2

Glasshouse trial results

| Glyphosate Rate (ga.i./ha) | Water Hardness (as ppm CaCO$_3$) | No Adjuvant | Deluge 1000 | Assert | Hot-Up | | Assert + Infiltrator | Composition C | | | Composition D | | |
|---|---|---|---|---|---|---|---|---|---|---|---|---|---|
| | | | 0.1 | 2.0 | 0.1 | 0.25 | 0.5 | 2.0 + 0.5 | 0.1 | 0.25 | 0.5 | 0.1 | 0.25 | 0.5 |
| none | | | | | | | | | | | | | | |
| 50 | 50 | 73 | 56 | 44 | 58 | 47 | 34 | 40 | 49 | 43 | 29 | 76 | 55 | 46 |
| 50 | 300 | 106 | — | 45 | 80 | 55 | 42 | 24 | 76 | 47 | 26 | 81 | 42 | 22 |
| 100 | 50 | 52 | 38 | 38 | 49 | 24 | 24 | 31 | 42 | 30 | 22 | 43 | 30 | 21 |
| 100 | 300 | 65 | — | 47 | 50 | 33 | 29 | 34 | 69 | 45 | 30 | 49 | 49 | 29 |

Discussion

The trial confirms the following well established facts regarding the use of glyphosate as a herbicide:

Higher rate of Glyphosate results in lower fresh weight of weed.

Addition of wetting agent results in lower fresh weight of weed. (Deluge 1000 was not applied in hard water).

Application in hard water increases fresh weight of weed.

Addition of ammonium sulphate results in lower fresh weight of weed and tends to limit the effect of hard water.

The combination of oil, cationic surfactants and ammonium sulphate in the product Hot-Up can be more effective than either wetting agent or ammonium sulphate alone. Higher application rate results in lower fresh weight of weed.

Using an oil adjuvant (Infiltrator) and ammonium sulphate adjuvant (Assert) results in lower fresh weight than ammonium sulphate alone.

The trial also shows that the formulations according to the invention, Compositions C and D, when applied under the conditions of this experiment are effective adjuvants for the agrochemical glyphosate. Both of Compositions C and D provide herbicidal efficacy enhancement to glyphosate which is similar to the commercial product Hot-Up. Compositions C and D when applied at 0.5% result in equivalent or better adjuvant effects than those obtained with the combination of 0.5% Infiltrator (oil) plus 2.0% Assert (ammonium sulphate).

In summary, Compositions C and D provide results which are comparable to or better than the prior art adjuvant options, and yet contain very low levels of surfactants which are likely to enable their use in situations where the use of harsh surfactants is restricted.

The word 'comprising' and forms of the word 'comprising' as used in this description and in the claims does not limit the invention claimed to exclude any variants or additions.

Those skilled in the art will appreciate that the invention described herein is susceptible to, variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

The invention claimed is:

1. An oil-in-water emulsion liquid composition suitable for use as an agricultural adjuvant comprising:
   (a) an amount in the range of from 5 to 95% w/w of an oil selected from the group consisting of mineral oils, vegetable oils, esters of fatty acids, aliphatic alcohols and mixtures thereof;
   (b) an amount in the range of from 5 to 95% w/w of an aqueous solution of an ammonium salt selected from the group consisting of ammonium sulphate, ammonium phosphates, ammonium nitrate and mixtures thereof, where said aqueous solution comprises 20 to 50% w/w ammonium salt; and
   (c) an amount in the range of from 0.1 to 5% w/w of one or more high molecular weight polymeric surfactants having a molecular weight in the range 2000 to 12000,
   wherein the proportion of total surfactants to oil in the composition is less than 1:3.

2. The composition according to claim 1 wherein the proportion of total surfactants to oil in the composition is less than 1:4.

3. The composition according to claim 1 wherein proportion of total surfactants to oil in the composition is less than 1:6.

4. The composition according to claim 1 wherein the amount of oil used in the composition is in the range of from 20 to 50% w/w.

5. The composition according to claim 1 wherein the amount of the aqueous solution of ammonium salts used in the composition is in the range of from 50 to 75% w/w.

6. The composition according to claim 1 wherein the amount of high molecular weight polymeric surfactant used in the composition is in the range from 0.1 to 3% w/w.

7. The composition according to claim 1 wherein the amount of high molecular weight polymeric surfactant used in the composition is in the range from 0.2 to 2% w/w.

8. The composition according to claim 1 wherein the composition comprises:
   (a) an amount in the range of from 10 to 60% w/w of an oil selected from the group consisting of mineral oils, vegetable oils, esters of fatty acids, aliphatic alcohols and mixtures thereof;
   (b) an amount in the range of from 40 to 80% w/w of an aqueous solution of an ammonium salt selected from the group consisting of ammonium sulphate, ammonium phosphates, ammonium nitrate and mixtures thereof, where said aqueous solution comprises 20 to 50% w/w ammonium salt; and
   (c) an amount in the range of from 0.1 to 3% w/w of one or more high molecular weight polymeric surfactants having a molecular weight in the range 2000 to 12000,
   wherein the proportion of total surfactants to oil in the composition is less than 1:3.

9. The composition according to claim 1 wherein the composition comprises:
   (a) an amount in the range of from 20 to 50% w/w of an oil selected from the group consisting of mineral oils, vegetable oils, esters of fatty acids, aliphatic alcohols and mixtures thereof;

(b) an amount in the range of from 50 to 75% w/w of an aqueous solution of an ammonium salt selected from the group consisting of ammonium sulphate, ammonium phosphates, ammonium nitrate and mixtures thereof, where said aqueous solution comprises 20 to 50% w/w ammonium salt; and (c) an amount in the range of from 0.2 to 2% w/w of one or more high molecular weight polymeric surfactants having a molecular weight in the range 2000 to 12000, wherein the proportion of total surfactants to oil in the composition is less than 1:3.

10. The composition according to claim 1 wherein the one or more high molecular weight polymeric surfactants are selected from the group consisting of polyalkylene oxide block copolymers of a simple primary alcohol, polyisobutene succinic anhydride-polyethylene glycol, polyhydroxystearate polyethers, polyalkylene oxide triblock copolymers of EO/PO/EO and mixtures thereof.

11. The composition according to claim 1 wherein the one or more high molecular weight polymeric surfactants are polyalkylene oxide block copolymers of a simple primary alcohol.

12. The composition according to claim 1 further comprising an additive to help the application of the composition selected from the group consisting of dispersing agents, acidifiers and mixtures thereof.

13. The composition according to claim 11 wherein the additive comprises one or more dispersing agents selected from the group consisting of nonionic surfactants, anionic surfactants and mixtures thereof.

14. The composition according to claim 13 wherein the dispersing agent is present in the composition in an amount up to 5% w/w of the total composition.

* * * * *